No. 838,842. PATENTED DEC. 18, 1906.
L. D. CASTLE.
GATE VALVE.
APPLICATION FILED SEPT. 25, 1905.
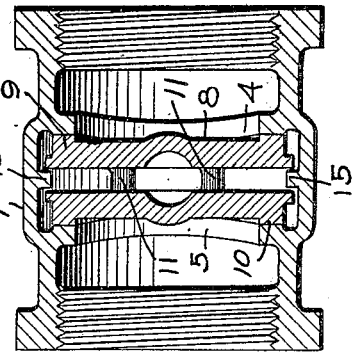
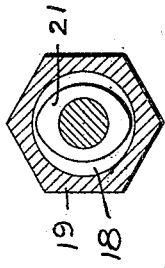
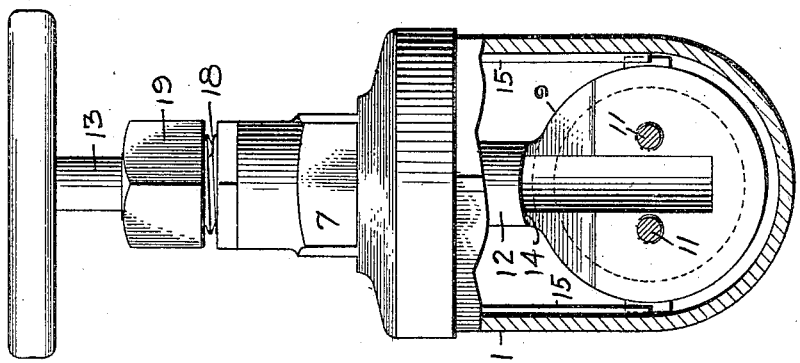
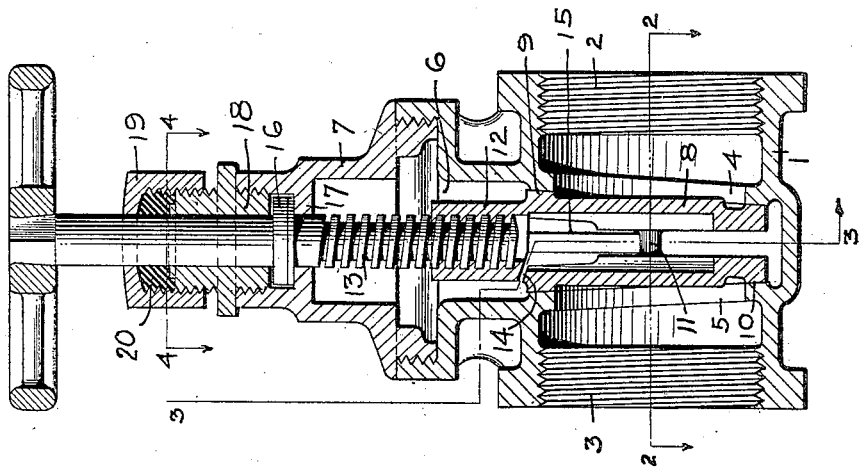
WITNESSES.
J. R. Keller
Robert C. Totten
INVENTOR.
Lewis D. Castle
By Kay Totten Winter
attorneys

UNITED STATES PATENT OFFICE.

LEWIS D. CASTLE, OF BARBERTON, OHIO, ASSIGNOR TO PITTSBURGH VALVE AND FITTINGS COMPANY, OF PITTSBURG, PENNSYLVANIA, A CORPORATION OF NEW JERSEY.

GATE-VALVE.

No. 838,842.   Specification of Letters Patent.   Patented Dec. 18, 1906.

Application filed September 25, 1905. Serial No. 280,035.

*To all whom it may concern:*

Be it known that I, LEWIS D. CASTLE, a resident of Barberton, in the county of Summit and State of Ohio, have invented a new and useful Improvement in Gate-Valves; and I do hereby declare the following to be a full, clear, and exact description thereof.

This invention relates to gate or straightway valves, and especially to valves of this type of small size.

The object is to provide a valve of this character in which the valve-disk will always bear firmly on the seats in the casing, even though said seats should not be true.

Small-sized straightway or gate valves have heretofore been constructed with solid disks, and consequently if the casing becomes bent or distorted, so that the seats thereof are forced out of their proper position, the disk does not contact firmly therewith, and consequently the valve leaks. Large valves of this type have the disks formed in several parts suitably secured together and having movement independently of each other, so that a firm bearing on the valve-seats is always insured. Small-sized valves, however, have not heretofore been so constructed, due to the fact that the disk is so small that it cannot well be made in sections hinged or otherwise suitably secured together.

One of the objects of my invention is to provide a small-sized valve of this type in which the disk is formed of two face disk members united by means of a ligament or ligaments near the center thereof, but said disks having no other connection with each other, so that they can yield or move slightly one with reference to the other.

In the accompanying drawings, Figure 1 is a vertical longitudinal section through my improved valve. Fig. 2 is a horizontal section on the line 2 2, Fig. 1. Fig. 3 is a vertical transverse section on the line 3 3, Fig. 1; and Fig. 4 is a detail view of the bearing-block.

My improved valve has a body or casing 1, which may be of the usual or any preferred construction, the same being provided with an inlet-port 2, outlet-port 3, and with the seats 4 and 5, which face in opposite directions and which preferably are inclined, as shown, so as to form a wedge-shaped space therebetween. On the upper side of the body is an opening 6, threaded internally, as shown, and in which is secured the threaded lower end of the bonnet or hood 7.

The disk 8 is formed of a single casting or the like and is provided with disk-faces 9 and 10, having seats for coöperating with the seats 4 and 5. These face-disks are unconnected with each other except for the ligaments or columns 11, located near the centers of said disks. One of these disks is provided with a projection 12 for the attachment of the actuating-screw 13; but the other disk is separated therefrom by means of the kerf 14. These disks, projection 12, and ligaments or columns 11 are formed as an integral casting, and the kerf 14 is afterward cut. Consequently the two disk members have no connection except through the ligaments or columns, and these are sufficiently small so as to yield slightly to allow the disk-faces to adjust themselves to the seats 4 and 5.

The ligaments or columns 11 are preferably located as near the center of the disk members as possible, so as to permit said disk members to move relatively to each other in any direction. In case a traversing actuating-screw is used a single ligament or column located at the center of the disk members is preferably employed. In the drawings, however, is shown a non-traversing actuating-screw, and since when the valve is raised the disk must pass up onto the screw it is necessary to provide a space through the central diameter of the disk members for the end of the screw. Consequently two ligaments located on opposite sides of the position of the screw are employed.

The valve casing or body is provided on either side with a rib 15, which project between the edges of the disk members, thus guiding said disk members and preventing the same from scraping against the valve-seats.

The screw 13 has a threaded engagement with the sleeve or projection 12 on the disk. It passes up through an unthreaded opening in the bonnet and is provided with a collar 16, which is held between a ledge 17 in the bonnet and the lower end of a sleeve-nut 18, screwed down into the upper end of the bonnet. In case a traversing screw is used the lower end is attached to the disk, and it passes up through a threaded opening in the bonnet. In that case the sleeve-nut 18 is a part of the bonnet.

The sleeve-nut 18 or the upper end of the bonnet, as the case may be, is externally threaded to receive the packing cap or nut 19, which serves to force the packing material 20 tightly around the spindle to form the stuffing-box. The upper end of the sleeve-nut 18 or bonnet is provided with a bearing-block 21, which is of less diameter than the internal diameter of the cap 19 and which has curved edge portions non-concentric with the spindle-opening, either being eccentric to said opening or elliptical, as shown in the drawings. The cap 19 forces the packing material 20 into the space around this bearing-block, and as the faces thereof are non-concentric with the screw the rotation of the latter cannot rotate said packing, and consequently the nut or cap is prevented from working loose. At the same time the curved edges of the bearing-block do not cut the packing and destroy the same. This feature is not claimed in this application, but is claimed in a division of this application filed May 11, 1906, Serial No. 316,379.

What I claim is—

1. In a straightway valve, the combination of a casing provided with a valve-seat, a disk coöperating with said seat and being composed of a disk face member united by an integral ligament to a coöperating backing member, and means for the attachment of actuating mechanism thereto.

2. In a straightway valve, the combination of a casing provided with valve-seats, a disk coöperating with said seats and being composed of two disk face members spaced apart and united by a ligament integral with said members, said disk being provided with means for the attachment of actuating mechanism.

3. In a straightway valve, the combination of a casing provided with oppositely-facing valve-seats, a disk coöperating with said seats and being composed of two members spaced apart and united near their centers by a ligament integral with said members, said disk being provided with means for the attachment of actuating mechanism.

4. In a straightway valve, the combination of a casing provided with oppositely-facing inclined valve-seats, a disk coöperating with said seats and being wedge-shaped and composed of two members spaced apart and united by a ligament integral with said members, said disk being provided with means for the attachment of actuating mechanism.

5. In a straightway valve, the combination of a casing provided with oppositely-facing valve-seats, a disk coöperating with said seats and being composed of two members spaced apart and united by a ligament integral with said members, one of said members being provided with an extension, and an actuating-screw operatively connected to said extension.

6. A disk valve comprising an integral casting having two disk members spaced apart and united by a ligament or ligaments and having on one edge portion a sleeved extension, one of said disk members being separated from said sleeved extension.

In testimony whereof I, the said LEWIS D. CASTLE, have hereunto set my hand.

LEWIS D. CASTLE.

Witnesses:
ADELAIDE M. MERZ,
SENEY A. DECKER.